US009846731B2

(12) United States Patent
McGrew et al.

(10) Patent No.: US 9,846,731 B2
(45) Date of Patent: *Dec. 19, 2017

(54) RESOLVING DATABASE ENTITY INFORMATION

(71) Applicant: Palantir Technologies, Inc., Palo Alto, CA (US)

(72) Inventors: Robert McGrew, Palo Alto, CA (US); Stephen Cohen, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,287

(22) Filed: Nov. 22, 2016

(65) Prior Publication Data

US 2017/0075970 A1 Mar. 16, 2017

Related U.S. Application Data

(63) Continuation of application No. 14/014,313, filed on Aug. 29, 2013, now Pat. No. 9,501,552, which is a
(Continued)

(51) Int. Cl.
G06F 17/30 (2006.01)

(52) U.S. Cl.
CPC .... *G06F 17/30569* (2013.01); *G06F 17/3056* (2013.01); *G06F 17/30303* (2013.01);
(Continued)

(58) Field of Classification Search
CPC ............. G06F 17/30569; G06F 17/30303
(Continued)

(56) References Cited

U.S. PATENT DOCUMENTS 5,826,021 A 10/1998 Mastors et al.
5,832,218 A 11/1998 Gibbs et al.
(Continued)

FOREIGN PATENT DOCUMENTS

CN 102054015 5/2014
DE 102014204827 9/2014
(Continued)

OTHER PUBLICATIONS

"A Real-World Problem of Matching Records," Nov. 2006, <http://grupoweb.upf.es/bd-web/slides/ullman.pdf> pp. 1-16.
(Continued)

*Primary Examiner* — Chelcie Daye
(74) *Attorney, Agent, or Firm* — Hickman Palermo Becker Bingham LLP

(57) ABSTRACT

Entity resolution in a database comprises receiving imported data comprising imported data entities each having properties each having values; receiving first user input that selects the imported data entities for resolution to existing data entities in a database; receiving second user input that specifies matching criteria for matching the imported data entities to the existing data entities, wherein each of the matching criteria comprises a matching technique; matching the imported data entities to the existing data entities using the matching criteria, resulting in creating and storing matched entity information, wherein the matched entity information is organized in matched entity data sets associated with subsets of the matching criteria that were matched; consolidating the imported data entities into the existing data entities; storing the first user input and second user input as a named criteria set for use in subsequent entity resolution operations.

20 Claims, 13 Drawing Sheets

Related U.S. Application Data continuation of application No. 11/874,644, filed on Oct. 18, 2007, now Pat. No. 8,554,719.

(52) U.S. Cl.
CPC .. *G06F 17/30309* (2013.01); *G06F 17/30371* (2013.01); *G06F 17/30489* (2013.01); *G06F 17/30598* (2013.01)

(58) Field of Classification Search
USPC ................................................. 707/602, 748
See application file for complete search history.

(56) References Cited

U.S. PATENT DOCUMENTS

| | | |
|---|---|---|
| 5,878,434 A | 3/1999 | Draper et al. |
| 5,897,636 A | 4/1999 | Kaeser |
| 5,966,706 A | 10/1999 | Biliris et al. |
| 6,006,242 A * | 12/1999 | Poole .................... G06F 17/272 715/209 |
| 6,057,757 A | 5/2000 | Arrowsmith et al. |
| 6,134,582 A | 10/2000 | Kennedy |
| 6,243,717 B1 | 6/2001 | Gordon et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 7,058,648 B1 | 6/2006 | Lightfoot et al. |
| 7,089,541 B2 | 8/2006 | Ungar |
| 7,403,942 B1 * | 7/2008 | Bayliss ............ G06F 17/30303 707/748 |
| 7,461,158 B2 | 12/2008 | Rider et al. |
| 7,627,489 B2 | 12/2009 | Schaeffer et al. |
| 7,757,220 B2 * | 7/2010 | Griffith .................... G06F 8/51 700/104 |
| 7,912,842 B1 | 3/2011 | Bayliss |
| 7,962,495 B2 | 6/2011 | Jain et al. |
| 8,117,022 B2 | 2/2012 | Linker |
| 8,126,848 B2 | 2/2012 | Wagner |
| 8,290,838 B1 | 10/2012 | Thakur et al. |
| 8,302,855 B2 | 11/2012 | Ma et al. |
| 8,364,642 B1 | 1/2013 | Garrod |
| 8,417,715 B1 | 4/2013 | Bruckhaus et al. |
| 8,429,527 B1 | 4/2013 | Arbogast |
| 8,554,719 B2 | 10/2013 | McGrew |
| 8,601,326 B1 | 12/2013 | Kim |
| 8,639,552 B1 | 1/2014 | Chen et al. |
| 8,688,573 B1 | 4/2014 | Rukonic et al. |
| 8,812,444 B2 | 8/2014 | Garrod et al. |
| 8,838,538 B1 | 9/2014 | Landau et al. |
| 8,903,717 B2 | 12/2014 | Elliot |
| 8,924,388 B2 | 12/2014 | Elliot et al. |
| 8,924,389 B2 | 12/2014 | Elliot et al. |
| 8,938,686 B1 | 1/2015 | Erenrich et al. |
| 9,105,000 B1 | 8/2015 | White et al. |
| 2002/0035590 A1 | 3/2002 | Eibach et al. |
| 2002/0095360 A1 | 7/2002 | Joao |
| 2002/0103705 A1 | 8/2002 | Brady |
| 2003/0093401 A1 | 5/2003 | Czahowski et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0117387 A1 | 6/2004 | Civetta et al. |
| 2004/0153451 A1 | 8/2004 | Philips et al. |
| 2004/0210763 A1 * | 10/2004 | Jonas ................ G06F 17/30477 713/193 |
| 2004/0236688 A1 | 11/2004 | Bozeman |
| 2005/0010472 A1 | 1/2005 | Quatse et al. |
| 2005/0097441 A1 | 5/2005 | Herbach et al. |
| 2005/0131935 A1 | 6/2005 | O'Leary et al. |
| 2005/0262512 A1 | 11/2005 | Schmidt et al. |
| 2006/0010130 A1 | 1/2006 | Leff et al. |
| 2006/0080316 A1 | 4/2006 | Gilmore et al. |
| 2006/0143075 A1 | 6/2006 | Carr et al. |
| 2006/0178954 A1 * | 8/2006 | Thukral ............... G06Q 10/087 705/28 |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2007/0000999 A1 | 1/2007 | Kubo et al. |
| 2007/0067285 A1 | 3/2007 | Blume |
| 2007/0178501 A1 | 8/2007 | Rabinowitz et al. |
| 2007/0233756 A1 | 10/2007 | D'Souza et al. |
| 2007/0271317 A1 | 11/2007 | Carmel |
| 2007/0284433 A1 | 12/2007 | Domenica et al. |
| 2007/0295797 A1 * | 12/2007 | Herman ................ G06Q 10/10 235/375 |
| 2007/0299697 A1 | 12/2007 | Friedlander et al. |
| 2008/0005063 A1 | 1/2008 | Seeds |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0195672 A1 | 8/2008 | Hamel et al. |
| 2008/0228467 A1 | 9/2008 | Womack et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0313132 A1 | 12/2008 | Hao et al. |
| 2009/0055487 A1 | 2/2009 | Moraes et al. |
| 2009/0106178 A1 | 4/2009 | Chu |
| 2009/0106242 A1 | 4/2009 | McGrew et al. |
| 2009/0112745 A1 | 4/2009 | Stefanescu |
| 2009/0164387 A1 | 6/2009 | Armstrong et al. |
| 2009/0187546 A1 | 7/2009 | Whyte et al. |
| 2009/0249244 A1 | 10/2009 | Robinson et al. |
| 2009/0271343 A1 | 10/2009 | Vaiciulis et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2010/0057622 A1 | 3/2010 | Faith et al. |
| 2010/0070842 A1 | 3/2010 | Aymeloglu et al. |
| 2010/0703531 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Gilbert et al. |
| 2010/0145909 A1 | 6/2010 | Ngo |
| 2010/0204983 A1 | 8/2010 | Chung et al. |
| 2010/0306285 A1 | 12/2010 | Shah et al. |
| 2011/0066497 A1 | 3/2011 | Gopinath et al. |
| 2011/0093327 A1 | 4/2011 | Fordyce et al. |
| 2011/0099133 A1 | 4/2011 | Chang et al. |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0252282 A1 | 10/2011 | Meek et al. |
| 2011/0258216 A1 | 10/2011 | Supakkul et al. |
| 2012/0013684 A1 | 1/2012 | Lucia |
| 2012/0022945 A1 | 1/2012 | Falkenborg et al. |
| 2012/0059853 A1 | 3/2012 | Jagota |
| 2012/0078595 A1 | 3/2012 | Balandin et al. |
| 2012/0084287 A1 | 4/2012 | Lakshminarayan et al. |
| 2012/0191446 A1 | 7/2012 | Binsztok et al. |
| 2012/0215784 A1 | 8/2012 | King et al. |
| 2013/0096968 A1 | 4/2013 | Van Pelt et al. |
| 2013/0097130 A1 | 4/2013 | Bingol et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0166480 A1 | 6/2013 | Popescu et al. |
| 2013/0208565 A1 | 8/2013 | Orji et al. |
| 2013/0226944 A1 | 8/2013 | Baid et al. |
| 2014/0006404 A1 | 1/2014 | McGrew et al. |
| 2014/0108074 A1 | 4/2014 | Miller et al. |
| 2014/0222793 A1 | 8/2014 | Sadkin et al. |

(56) References Cited

U.S. PATENT DOCUMENTS

| | | |
|---|---|---|
| 2014/0358829 A1 | 12/2014 | Hurwitz |
| 2015/0012509 A1 | 1/2015 | Kirn |
| 2015/0046481 A1 | 2/2015 | Elliot |
| 2015/0106379 A1 | 4/2015 | Elliot et al. |

FOREIGN PATENT DOCUMENTS

| | | |
|---|---|---|
| DE | 102014204830 | 9/2014 |
| DE | 102014204834 | 9/2014 |
| DE | 102014213036 | 1/2015 |
| EP | 2487610 | 8/2012 |
| EP | 2778913 | 9/2014 |
| EP | 2778914 | 9/2014 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2009/051987 | 4/2009 |
| WO | WO 2010/030919 | 3/2010 |

OTHER PUBLICATIONS

"A Tour of Pinboard," <http://pinboard.in/tour> as printed May 15, 2014 in 6 pages.

Delicious, <http://delicious.com/> as printed May 15, 2014 in 1 page.

Hua et al., "A Multi-attribute Data Structure with Parallel Bloom Filters for Network Services" HiPC 2006, LNCS 4297, pp. 277-288, 2006.

Johnson, Maggie "Introduction to YACC and Bison".

Johnson, Steve, "Access 2013 on demand," Access 2013 on Demand, May 9, 2013, Que Publishing.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Wang et al., "Research on a Clustering Data De-Duplication Mechanism Based on Bloom Filter," IEEE 2010, 5 pages.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

Official Communication for New Zealand Patent Application No. 622389 dated Mar. 20, 2014.

Official Communication for New Zealand Patent Application No. 622404 dated Mar. 20, 2014.

Extended European Search Report for European Patent Application No. 14158958.0 dated Jun. 3, 2014.

Extended European Search Report for European Patent Application No. 14158977.0 dated Jun. 10, 2014.

Official Communication for New Zealand Patent Application No. 622439 dated Mar. 24, 2014.

Official Communication for New Zealand Patent Application No. 622439 dated Jun. 6, 2014.

Official Communication for New Zealand Patent Application No. 622473 dated Mar. 27, 2014.

Official Communication for New Zealand Patent Application No. 622473 dated Jun. 19, 2014.

Official Communication for New Zealand Patent Application No. 628161 dated Aug. 25, 2014.

Official Communication for Great Britain Patent Application No. 1404499.4 dated Aug. 20, 2014.

Official Communication for Great Britain Patent Application No. 1404486.1 dated Aug. 27, 2014.

Official Communication for Great Britain Patent Application No. 1404489.5 dated Aug. 27, 2014.

Official Communication for Great Britain Patent Application No. 1411984.6 dated Dec. 22, 2014.

Official Communication for Australian Patent Application No. 2014201506 dated Feb. 27, 2015.

Official Communication for Australian Patent Application No. 2014201507 dated Feb. 27, 2015.

Official Communication for European Patent Application No. 14158977.0 dated Apr. 16, 2015.

Official Communication for European Patent Application No. 14158958.0 dated Apr. 16, 2015.

Official Communication for Australian Patent Application No. 2014203669 dated May 29, 2015.

Official Communication for Great Britain Patent Application No. 1404486.1 dated May 21, 2015.

European Patent Office,"Search Report", in application No. 08839003.4-1225, dated Aug. 14, 2012, 9 pages.

Current Claims in application No. 08839003.4-1225, dated Aug. 2012, 5 pages.

Nin et al., "On the Use of Semantic Blocking Techniques for Data Cleansing and Integration", IEEE, dated 2007, 10 pages.

Sekine et al., Definition, Dictionaries and Tagger for Extended Name Entity Hierarchy dated May 2004, 4 pages.

Gu et al., "Record Linkage: Current Practice and Future Directions", dated Jan. 15, 2004, 32 pages.

Nadeau et al., "A Survey of Names Entity Recognition and Classification" dated Jan. 15, 2004, 20 pages.

European Patent Office, "Search Report" in application No. 09813700.3-1507, dated Apr. 3, 2014, 9 pages.

E-MailRelay, Wayback Machine, dated Aug. 21, 2008, 2 pages.

Current Claims in European application No. 098137000.3-1507, dated Apr. 2014, 7 pages.

Brandel, Mary Brandel, "Dos and Don't's for Data Loss Prevention", wayback machine, dated Jul. 24, 2008, 6 pages.

Chaudhuri et al., "An Overview of Business Intelligence Technology," Communications of the ACM, Aug. 2011, vol. 54, No. 8.

Wikipedia, "Multimap," Jan. 1, 2013, https://en.wikipedia.org/w/index.php?title=Multimap&oldid=530800748.

Winkler, William, "Matching and Record Linkage," Wiley Interdisciplinary Reviews: Computational Statistics, vol. 5, No. 5, dated Sep. 1, 2014, 38 pages.

Official Communication for Netherlands Patents Application No. 2012421 dated Sep. 18, 2015.

Official Communication for Netherlands Patents Application No. 2012417 dated Sep. 18, 2015.

Official Communication for Netherlands Patent Application No. 2012438 dated Sep. 21, 2015.

Official Communication for European Patent Application No. 08839003.4 dated Nov. 27, 2015, 6 pages.

Claims for European Patent Application No. 08839003.4 dated Nov. 2015, 6 pages.

Official Communication for Great Britain Patent Application No. 1404489.5 dated May 21, 2015.

Official Communication for Netherlands Patent Application No. 2013134 dated Apr. 20, 2015.

Official Communication for Great Britain Patent Application No. 1404499.4 dated Jun. 11, 2015.

U.S. Appl. No. 12/556,307, filed Sep. 9, 2009, Office Action, dated Oct. 1, 2013.

U.S. Appl. No. 14/552,336, filed Nov. 24, 2014, Notice of Allowance, dated Nov. 3, 2015.

U.S. Appl. No. 14/571,098, filed Dec. 15, 2014, First Action Interview, dated Aug. 24, 2015.

(56) References Cited

OTHER PUBLICATIONS

U.S. Appl. No. 13/827,491, filed Mar. 14, 2013, Office Action, dated Oct. 9, 2015.
U.S. Appl. No. 14/571,098, filed Dec. 15, 2014, First Action Interview, dated Nov. 10, 2015.
U.S. Appl. No. 14/800,447, filed Jul. 15, 2015, First Action Interview, dated Dec. 10, 2015.
U.S. Appl. No. 12/556,307, filed Sep. 9, 2009, Notice of Allowance, dated Jan. 4, 2016.
U.S. Appl. No. 14/304,741, filed Jun. 13, 2014, Notice of Allowance, dated Apr. 7, 2015.
U.S. Appl. No. 14/304,741, filed Jun. 13, 2014, Office Action Pre Interview, dated Aug. 6, 2014.
U.S. Appl. No. 13/827,491, filed Mar. 14, 2013, Office Action, dated Dec. 1, 2014.
U.S. Appl. No. 14/304,741, filed Jun. 13, 2014, Final Office Action, dated Mar. 3, 2015.
U.S. Appl. No. 14/571,098, filed Dec. 15, 2014, First Office Action Interview, dated Mar. 11, 2015.
U.S. Appl. No. 12/556,307, filed Sep. 9, 2009, Office Action, dated Jun. 9, 2015.
U.S. Appl. No. 13/827,491, filed Mar. 14, 2013, Final Office, dated Jun. 22, 2015.
U.S. Appl. No. 14/552,336, filed Nov. 24, 2014, First Office Action Interview, dated Jul. 20, 2015.
U.S. Appl. No. 14/571,098, filed Dec. 15, 2014, First Office Action Interview, dated Aug. 5, 2015.
U.S. Appl. No. 14/014,313, filed Aug. 29, 2013, Final Office Action, dated Feb. 26, 2016.
U.S. Appl. No. 14/014,313, filed Aug. 29, 2013, First Office Action Interview, dated Jun. 18, 2015.
U.S. Appl. No. 14/014,313, filed Aug. 29, 2013, Notice of Allowance, dated Jul. 20, 2016.

* cited by examiner

FIG. 3

Data Import

*You will now ensure that Palantir has appropriately guessed the correct table types, column types, and link types for each of your data sources.*

*For each data source listed at the top of the screen, check to make sure the information on table type, column type, and link type is correct. If it is not, simply navigate the corresponding pull-down menu and choose the right option.*

*The Details Window on the right side of the screen lists the details of the selected data source.*

*When you are finished, click the "next" button in bottom right corner of the screen.*

302

Structured Data Sources — 304

| Charity Payments.csv | calls.csv | profiles.csv |
|---|---|---|
| Number of rows: 4 | Number of rows: 39 | Number of rows: 128 |

Source File: profiles.csv
Table Type: Person — 308

306

| Column Name | Column Type | Role | Link Type | Ref. |
|---|---|---|---|---|
| first_name | Name (First) ▽ | None ▽ | | |
| last_name | Name (Last) ▽ | None ▽ | | |
| day_phone | Phone Number ▽ | None ▽ | 314 | |
| night_phone | Phone Number ▽ | None ▽ | | |
| citizenship | Unspecified ▽ | None ▽ | | 316 |
| email | Email ▽ | None ▽ | | |
| address 1 | Address (Address 1) ▽ | None ▽ | | |
| address 2 | Address (Address 2) ▽ | None ▽ | | |
| city | Address (City) ▽ | None ▽ | | |
| state | Address (State) ▽ | None ▽ | | |
| zip | Address (Zip Code) ▽ | None ▽ | | |

322
312
310

Details Window Sample Row1 ▽ — 318

Person Ahmad Aljohani
Label Ahmad Ahmad Aljohani
☐ ⊞ Address     121 Temple St. San Bernadino, Ca 94530
☐ ⊞ Email       aaljohani@gmail.com
☐ ⊞ Name        Ahmad Aljohani
☐ ⊞ Phone Number  966-2416-8923

320

[cancel] [back] [next]

Data Import

You will now ensure that Palantir has appropriately guessed the correct table types, column types, and link types for each of your data sources.

For each data source listed at the top of the screen, check to make sure the information on table type, column type, and link type is correct. If it is not, simply navigate the corresponding pull-down menu and choose the right option.

The Details Window on the right side of the screen lists the details of the contents of the selected data source.

When you are finished, click the "next" button in bottom right corner of the screen.

Structured Data Sources — 304

- Charity Payments.csv — Number of rows: 4
- calls.csv — Number of rows: 39
- profiles.csv — Number of rows: 128

Source File: Charity Payments.csv — 306
Table Type: Payment

| Column Name | Column Type | Role | Link Type | Ref. |
|---|---|---|---|---|
| from | Name | From | Participates In | 🔍 |
| to | Organization Name | To | Participates In | ⊕ |
| amount | Amount | None | | |
| date | Date | None | | |

312 — 314 — 316 — 402, 404, 406

Details Window [Sample Row 1 ▽] — 318

Payment: Habib Faraj Pays Islamic Heritage Fo
Label: Habib Faraj Pays Islamic Heritage Fo
Date Began: 04/12/2006 00:00
Date Ended: 04/13/2006 23:59
☐ Amount
  ⊞ $25,000.00
☐ Name
  ⊞ Habib Faraj (from)
☐ Organization Name
  ⊞ Islamic Heritage Foundation
☐ Person
  ⊞ Person: Habib Faraj
☐ Business
  ⊞ Business: Islamic Heritage Foundation

[next] [back] [cancel]

Data Import Errors 706

| Fix | Error Type | Error Data △ | Error Property | Error Data Source |
|---|---|---|---|---|
| ⊗ | PARSE_ERROR | xxxx | Phone Number | Book1.csv |

704 — 702 — 708 — 710 — 712

701

720

- ○ replace with [ ▽ ]
- ⊘ remove property
- ○ remove row
- ○ fix later

[apply all] [apply same] [apply]

*apply – applies changes to this error instance*

*apply same – applies changes to all errors of the same field value, type, and column*

*apply all – applies changes to all errors of the same type and column*

722

| first_name | day_phone | day_phone_2 | night_phone | citizenship | email | address1 | address2 | city | state | zip | country |
|---|---|---|---|---|---|---|---|---|---|---|---|
| MICHAEL | LONG | | XXXX | GB | MICHAEL.LONG@HOTMAIL.COM | 52 HIGHLAND LAKES ROAD | | SAN FRANCISCO | CA | 94538 | US |

[ ok ]

724

Entity Resolution — 801, 804

1. Select Entities for Reaction — showing 24/24 unresolved entities.

*Welcome to Palantir's Entity Resolver. You will notice that the Histogram window has opened alongside this window. At any time throughout the process, you may use the Histogram to highlight various data cohorts on the screen. By then clicking the "select highlighted" button, you can select just those entities to resolve.*

*On this screen, select those entities you would like to resolve. By default, all entities are selected (checked).*

*Select all button: Click here to select all the above entities for resolution.*

*Deselect all button: Click here to deselect all the above entities.*

*Cancel Button: Click here to cancel the entity resolution process.* — 810

*Next Button: Click here to proceed to the next step of entity resolution.* — 812

| Sel | Name ▽ | Phone Number | Address |
|---|---|---|---|
| ✓ | Mohd Fikri | +1-205-6563432 | 739 New Glory Way, Birmingham, AL 35201 Us |
| ✓ | Mohd Fikri | +1-925-9504905 | 19438 SE 14th Street, Livermore, Ca 94550-4763 Us |
| ✓ | Mohd Fikri | +1-925-9504904 | ., Livermore, Ca Us |
| ✓ | Omar Atari | | ., Ca Us |
| ✓ | Omar Atarji | +1-415-5907446 | 13406 157th Street Ct. E, San Francisco, Ca 94110 Us |
| ✓ | Omar Atarji | +1-207-4346434 | 373 Sunset Way, York, Ma 3910 Us |
| ✓ | Salah Saleh | +1-415-7226277 | 18 Dunbar Walk, San Francisco, Ca 94135 Us |
| ✓ | Salah Saleh | +1-415-7226277 | 18 Dunbar Walk, San Francisco, Ca 94127 Us |
| ✓ | Salah Saleh | | 18 Dunbar St, San Francisco, Ca 94127 Us |
| ✓ | Sameer Al-amoudi | +1-415-4104993 | 736 Dobson St, Alameda, Ca 94501 Us |
| ✓ | Sameer Al-amoudi | +1-415-4207321 | 736 Dobson St, Alameda, Ca 94501 Us |
| ✓ | Sameer Al-amoudi | | ., Ca Us |
| ✓ | Sami Hamnett | | ., Oakland, Ca 94606 Us |
| ✓ | Sami Hamnett | +1-415-4207321 | 8603 Lookover Circle, Oakland, Ca 94606 Us |
| ✓ | Samir Hamnett | +1-415-4207321 | 8603 Lookover Circle, Oakland, Ca 94606 Us |
| ✓ | Steven Al Shammari | +1-650-5193398 | 1732 East 30th Street, Larkspur, Ca 949.59 Us |
| ✓ | Steven Al Shammari | +1-650-5193398 | 1732 East 30th Street, Larkspur, Ca 94939 Us |
| ✓ | Thamer Athejres | +1-707-1159245 | ., Larkspur, Ca 94944 Us |
| ✓ | Thamer Athejres | +1-707-1159245 | Rt 4 Box 233, Vallejo, Ca 94590 Us |
| ✓ | Thamer Athejres | | ., Ca Us |
| ✓ | Yousif Fadeen | +1-707-1159245 | Rt 4 Box 233, Vallejo, Ca 94590 Us |
| ✓ | Yousif Faden | +1-510-2479018 | 1 Sapphire Drive, Alameda, Ca 94501 Us |
| ✓ | Yousif Faden | +1-302-5653453 | 1 Sapphire Drive, Alameda, Ca 94501 Us |
| ✓ | Yousif Faden | | ., De Us |

— 814  816  818  820

[ select highlighted ] [ select all ] [ deselect all ] — 822

2. Choose Matching Criteria
3. Find Successful Matches and Resolve
4. Check and Finalize

[ cancel ] [ next ]

FIG. 8

Entity Resolution

1. Select Entities for Reaction -- showing 6 unresolved entities.
2. Choose Matching Criteria for Group 1
3. Find Successful Matches and Resolve -- showing 2 entities with matches out of a total of 2 entities with matches.

Criteria:
Email, Address, Phone Number, Name

Matching Entities: (2)

| Sel | Entity ▽ | Match 1 |
|---|---|---|
| ☐ | Sameer Al-amoudi | + Sameer Al-amoudi |
| ☐ | Yousif Faden | + Yousif Faden |

Buttons: select unique matches | select highlighted | select all | cancel | deselect all | back | consolidate | next On this screen, the first panel lists which sets of properties your data has been linked to existing entities on, along with how many of the entities you are importing fit in each of those sets.
Clicking on one of the sets of properties will display to the right which of the entities that you are importing belong to that set as well as which existing entities they were matched to based on those properties.
To select only those entities for which there is one match, click the "select unique matches" button below. To select those matches you have highlighted by either clicking or with the Histogram, click "select highlighted". To select all matches, click "select all", and to deselect all matches, click "deselect all".
If there are incorrect matches for an entity, you can click on the small red "x" next to that match.
Once you are satisfied with your selections, click on the "consolidate" button below and move on to the next set of properties. When you are completely finished, click the "next"

4. Check and Finalize

*FIG. 10*

RESOLVING DATABASE ENTITY INFORMATION

BENEFIT CLAIM

This application claims the benefit under 35 U.S.C. §120 as a Continuation of application Ser. No. 14/014,313, filed Aug. 29, 2013, now U.S. Pat. No. 9,501,552, which is a continuation of application Ser. No. 11/874,644, filed Oct. 18, 2007, now U.S. Pat. No. 8,554,719, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to creating and storing information in databases.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Intelligence analysts and other computer users often interact with computer-based databases. When these users work with a large database containing information on millions of individuals, many individuals represented in the database may possess the same name, which can make it a challenge to determine what information refers to each unique real-world individual. Moreover, factors such as misspellings, alternate spellings, and missing information can cause further complications. The same issues are encountered when new data is imported into the database from external data sources. For databases that operate with terabytes of data, these problems are acute. Users and researchers in the database field desire to have systems that can ensure that there is only one database entry for each real person, such that one record relates to one unique entity in the database.

BRIEF DESCRIPTION OF THE DRAWINGS

In the drawings:

FIG. 3 illustrates an example column identification screen.

FIG. 4 illustrates setting the Role, Link Type, and Reference for a payments table.

FIG. 7 illustrates an example error display.

FIG. 8 illustrates an example Entity Resolver display.

FIG. 10 illustrates an example Entity Resolver screen showing results of matching.

DETAILED DESCRIPTION

Figure 1:
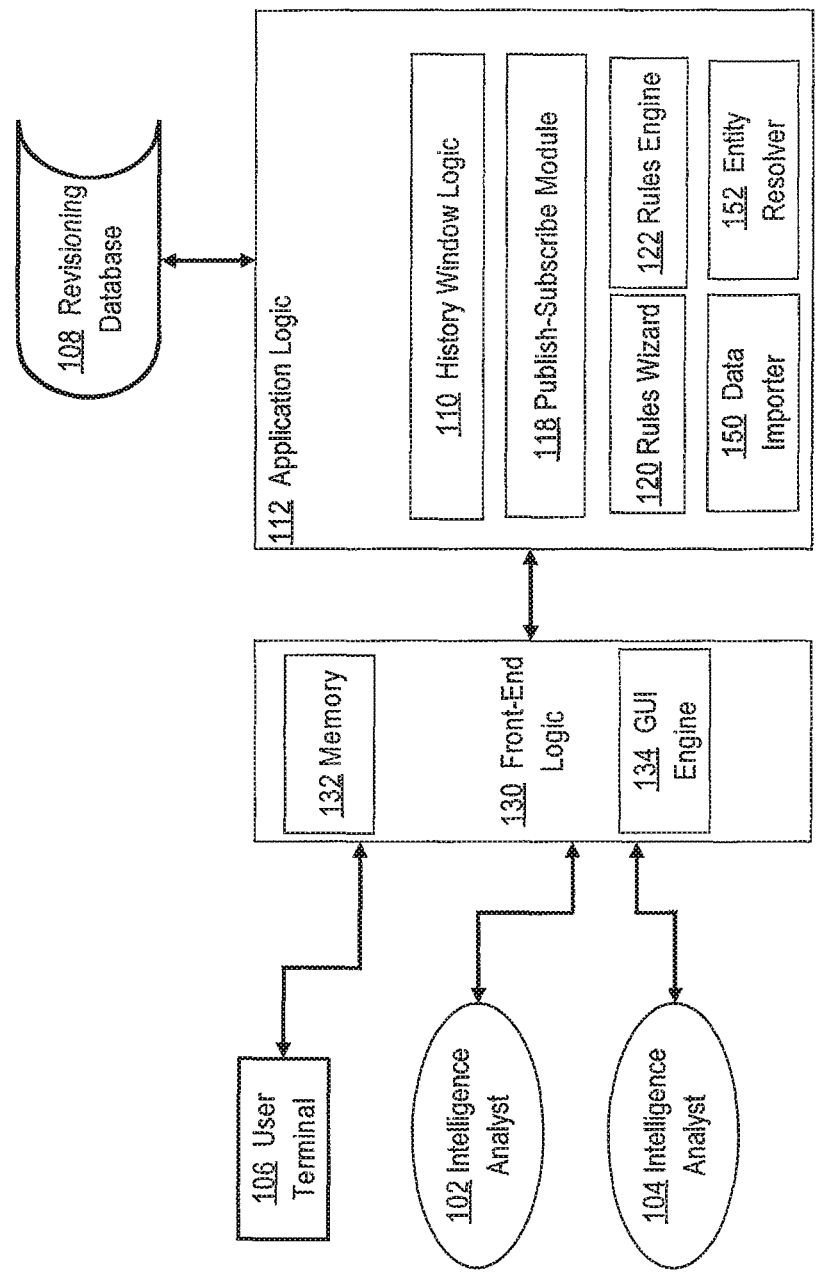
FIG. 1 illustrates a revisioning database system.

In an embodiment, entity resolution in a database comprises receiving imported data comprising imported data entities each having properties each having values; receiving first user input that selects the imported data entities for resolution to existing data entities in a database; receiving second user input that specifies matching criteria for matching the imported data entities to the existing data entities, wherein each of the matching criteria comprises a matching technique; matching the imported data entities to the existing data entities using the matching criteria, resulting in creating and storing matched entity information, wherein the matched entity information is organized in matched entity data sets associated with subsets of the matching criteria that were matched; consolidating the imported data entities into the existing data entities; storing the first user input and second user input as a named criteria set for use in subsequent entity resolution operations.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
        2.1 Example Operational Context—Database System
        2.2 Importing Data
        2.3 Entity Resolution
            2.3.1 Overview of Example Implementation
            2.3.2 Saved Criteria Sets
            2.3.3 Alternate Matching Techniques
            2.3.4 "One Click" Approach
    3.0 Implementation Mechanisms—Hardware Overview
    4.0 Extensions and Alternatives
    1.0 General Overview In an embodiment, a computer-readable data storage medium, apparatus or machine-implemented method are operable for receiving imported data comprising one or more imported data entities each having one or more properties each having one or more values; receiving first user input that selects one or more of the imported data entities for resolution to one or more existing data entities in a database; receiving second user input that specifies one or more matching criteria for matching the imported data entities to the existing data entities, wherein each of the matching criteria comprises a matching technique; matching the imported data entities to the existing data entities using the matching criteria, resulting in creating and storing matched entity information, wherein the matched entity information is organized in one or more matched entity data sets associated with one or more subsets of the matching criteria that were matched; consolidating the imported data entities into the existing data entities; storing the first user input and second user input as a named criteria set for use in subsequent entity resolution operations.

In one feature, the matching technique specifies no conflicts between values of properties of the imported data entities and the existing data entities.

Another feature further comprises receiving additional imported data for resolution to the existing data entities; receiving third user input that specifies a name of a stored criteria set; loading the stored criteria set; automatically performing the matching based on the stored criteria set and without receiving the second user input Yet another feature further comprises receiving the imported data; receiving the first user input as a selection of one of the imported data entities and one of the existing data entities in a database; receiving third user input requesting an entity resolution of the selected imported data entity and the selected existing data entity; loading the stored criteria set; automatically performing the matching based on the stored criteria set and performing the consolidating without receiving the second user input.

A further feature further comprises receiving third user input that specifies one or more target filters for types of the existing data entities, and performing the matching only for corresponding ones of the existing data entities in the database. Yet another feature further comprises displaying the imported data entities in a histogram display that identifies the imported data entities and corresponding counts of the values of the properties of the imported data entities; receiving the first user input as selections of one or more of the imported data entities in the histogram display.

Another feature comprises displaying, in a first panel of a graphical user interface, the subsets of the matching criteria that were matched, and counts of the one or more matched entity data sets associated with the one or more subsets of the matching criteria that were matched; receiving third user input that selects one of the subsets; displaying, in response to the third user input, in a second panel of the graphical user interface, each matching entity represented in the count of the selected subset.

In one feature, the consolidating comprises merging the imported data entities into the existing data entities.

Yet another feature further comprises displaying, in a graphical user interface, results of consolidating the imported data entities into the existing data entities, the results comprising a first list of one or more associations of resolved entities each comprising one of the imported data entities, one of the existing data entities, and an associated subset of the matching criteria that was matched for that association; a second list of one or more new entities to create in the database based on one or more of the imported data entities that did not match any of the existing data entities.

Still another feature comprises displaying, in a graphical user interface, four visually expandable and collapsible graphical regions associated with steps in an entity resolution process; wherein a first graphical region when expanded comprises a first list of the one or more imported data entities and one or more of the properties and one or more of the values; wherein a second graphical region when expanded comprises a first panel comprising the one or more matching criteria for matching the imported data entities to the existing data entities and the matching technique for each of the matching criteria, and a second panel comprising one or more target filters for types of the existing data entities; wherein a third graphical region when expanded comprises a third panel comprising the subsets of the matching criteria that were matched, and counts of the one or more matched entity data sets associated with the one or more subsets of the matching criteria that were matched, and a fourth panel comprising each matching entity represented in the count of a selected subset; wherein a fourth graphical region when expanded comprises a fifth panel comprising a second list of one or more associations of resolved entities each comprising one of the imported data entities, one of the existing data entities, and an associated subset of the matching criteria that was matched for that association; and a sixth panel comprising a third list of one or more new entities to create in the database based on one or more of the imported data entities that did not match any of the existing data entities.

2.0 Structural and Functional Overview

In one embodiment, a process for performing entity resolution for a database comprises:

1. Receiving a selection, by a user, of a subset of imported data records for resolution.

2. Receiving a user selection of a desired resolution approach including matching criteria.

3. Finding matches of the subset of records in a database based on selection properties that are useful for resolution, and storing the records in further subsets based on the number of matches, receiving selections of further subsets and consolidating the subsets, and displaying a view of a list of matches, based on sets of matched properties.

4. Receiving confirmation of the matches and finalizing the resolution of entities.

In one embodiment, the process further provides for storing a recording of user interaction with a graphical user interface that supports the preceding steps as a set of rules that can be executed automatically on other input data having the same format. Example user interaction steps that can be saved include selection of persons in the database, selection of matching types, etc. The rules may be saved as a criteria set, and a user may later load a criteria set and apply the criteria set to newly received data, rapidly importing the data into the database in a consistent and structured manner.

In an embodiment, matching techniques may include exact matches, fuzzy matches, and matches in which imported data has no conflicts with data of existing entities.

In an embodiment, a "one-click" process is provided for performing multiple entity resolution on data items represented in a graphical display, by selecting nodes of the graphical display and selecting a Consolidate function or the equivalent; in response, a data processing system automatically performs entity resolution.

Embodiments may operate with data from databases, spreadsheets, documents, XML files, and other data formats or file formats. In one embodiment, a visual data import process allows data analysts to connect with or import data from SQL, XML, email formats, semi-structured and unstructured text, and spreadsheet formats.

2.1 Example Operational Context—Database System

The techniques described herein may be used in many different database applications. In an embodiment, a revisioning database system stores data collected in intelligence operations by intelligence analysts or other members of an intelligence community. "Intelligence," in this context, refers to information about people, places, and events that is useful to a government or military organization in relation to issues of security or defense, and may include information obtained in covert operations or open operations. Other embodiments may be used in fields other than intelligence analysis. In an embodiment, the revisioning database system records metadata about changes to stored data, facilitates UNDO and REDO operations, can receive requests to subscribe to particular data and publish updates to such data for delivery to subscribers, and performs other functions.

FIG. 1 illustrates a revisioning database system. A revisioning database 108 is coupled to application logic 112, which implements the functions described herein for interacting with and using the revisioning database 108 in association with data such as intelligence community data. A user terminal 106 is coupled to front-end logic 130, which is coupled to application logic 112. The user terminal 106 of FIG. 1 broadly represents any host computer of an intelligence analyst, database administrator, or other user who interacts with revisioning database 108 through application logic 112. Database 108 may use a dynamic ontology of the type described in co-pending U.S. patent application Ser. No. 11/602,626, filed Nov. 20, 2006.

One or more other intelligence analysts 102, 104 can access application logic 112 through front-end logic 130 to obtain information from revisioning database 108 and to obtain services of the application logic. The intelligence analysts 102, 104 may be located in discrete security domains and different geographical locations, or may be co-located and/or within the same security domain. Each of the intelligence analysts 102, 104 may access application logic 112 through a host computer that is coupled directly or indirectly through one or more networks, network links, or internetworks to the application logic. User terminal 106 and the host computers of the intelligence analysts 102, 104 may comprise a personal computer, workstation, or other data processing system.

Front-end logic 130 comprises a memory 132 that stores copies of objects from revisioning database 108 for use in front-end operations, and a GUI engine 134 that generates graphical user interface displays for presenting data objects on user terminal 106 or displays of the intelligence analysts 102, 104.

In an embodiment, application logic 112 comprises history window logic 110, publish-subscribe module 118, rules wizard 120, rules engine 122, Data Importer 150 and Entity Resolver 152. History window logic 110 is configured to generate views and displays of historical states of objects in revisioning database 108 and historical states of graphs, comprising nodes representing the objects, which have been displayed by GUI engine 134. Publish-subscribe module 118 comprises logic configured to implement receiving and storing requests of analysts to subscribe to particular data views, detecting updates in data, and generating and sending publications of updated data to subscribers. Rules wizard 120 is configured to permit users to define rules that specify how objects in revisioning database 108 can be accessed and exported, as further described below. Rules engine 122 facilitates controlled publication and viewing of objects from revisioning database 108 based on realms and rules defined using the rules wizard 120.

Data importer 150 provides processes and graphical user interface logic for assisting a user in importing data into the revisioning database 108. Source data for importing may come from spreadsheets or other data sources at user terminal 106 or associated with the intelligence analysts. Entity resolution logic 152 provides processes and graphical user interface logic for resolving associations of entities represented in imported data to entities that are represented in revisioning database 108. Entity resolution logic 152 provides automatic processes for resolving which entities in imported data match existing entities in the database, and adding the imported data to the existing entities.

Data Importer 150 and Entity Resolver 152 are described in further detail in separate sections herein.

In an embodiment, export module 114, publish-subscribe module 118, rules wizard 120, rules engine 122, Data Importer 150 and Entity Resolver 152 may be implemented in a single computer program or module or may be integrated into revisioning database 108. Functions of rules wizard 120 may be implemented in whole or in part in front-end logic 130. Thus, the structural separation of functional modules as shown in FIG. 1 is not required and the same functions described herein for such functional modules may be implemented structurally in any other convenient manner.

Figure 2:
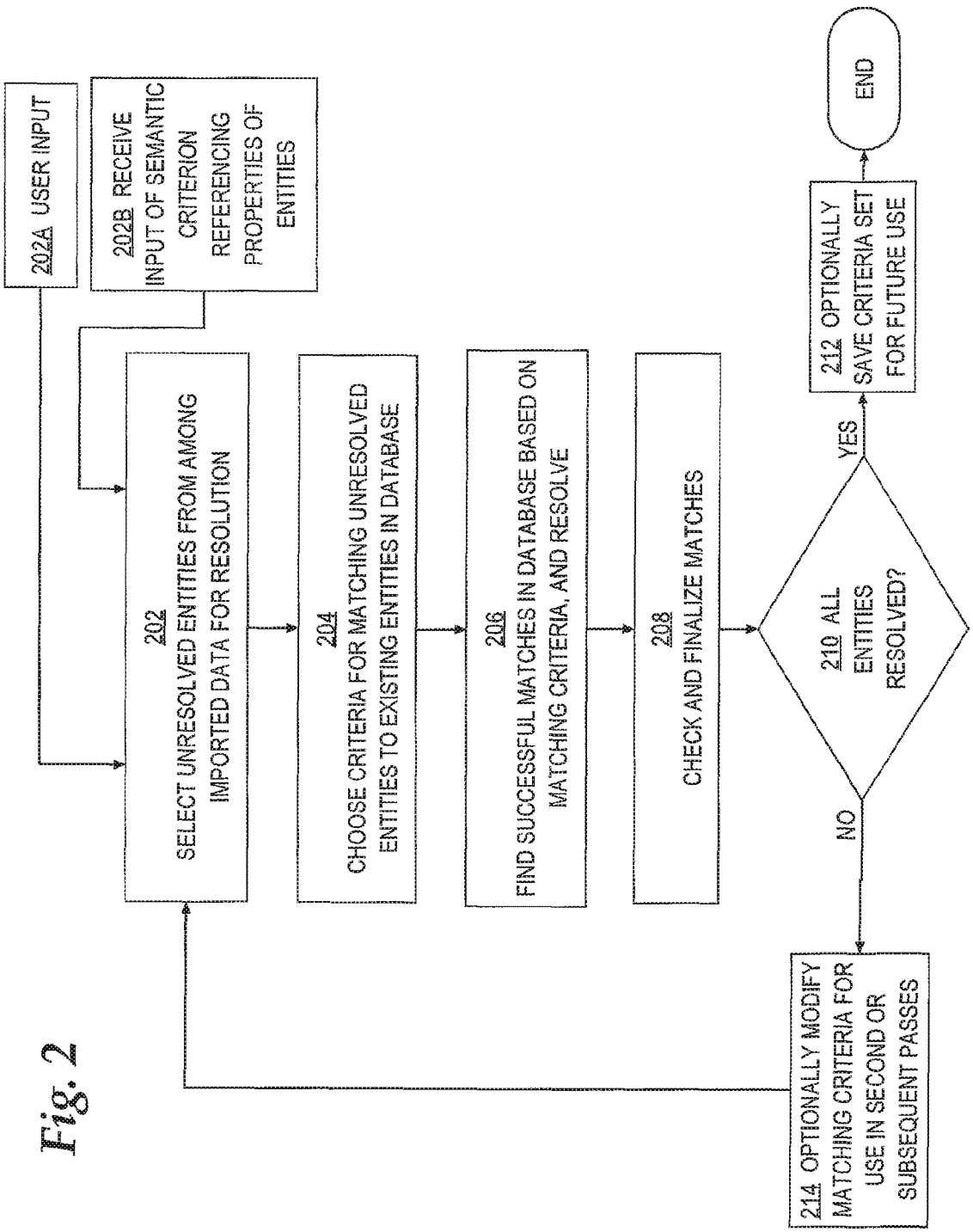
FIG. 2 illustrates a method for entity resolution in a database system.

FIG. 2 illustrates a method for entity resolution in a database system. In step 202, one or more unresolved entities are selected from among imported data. For example, a set of data is gathered and rows of the data are displayed. One or more rows are selected for resolution with an existing database, such as database 1080. In one embodiment, the selection of entities for resolution is performed by receiving user input in a user interface that selects particular entities, as indicated by step 202A. For example, a user might operate a pointing device to select one or more rows representing entities in a graphical user interface. Alternatively, as shown in step 202B, the selection of entities may comprise receiving input of a semantic criterion referencing properties of the entities. For example, a user might provide input such as "Select all entities whose citizenship property has the value 'US'." Natural language input may be used in conjunction with a parser, or a structured input mechanism such as Structured Query Language (SQL) may be used. Using input that references semantic criteria, a user can specify different matching criteria for different entities.

In step 204, one or more criteria are chosen for matching the unresolved entities to existing entities in the database. For example, matching criteria specify which properties or data fields of a row must match an entity in the database for the row to be considered the same entity.

In step 206, one or more successful matches in the database are found based on the matching criteria. For example, properties of the data rows that were selected in step 202, corresponding to the matching criteria selected in step 204, are matched against properties of entities that are already represented in the database.

In step 208, the matches are checked and finalized. In one embodiment, matches found in step 206 are displayed and a user confirms the matches for resolution. In response, the imported data for a row is associated with a matching entity in the database.

In an embodiment, an entity resolution process may be implemented as a multi-pass process in which different matching criteria are applied to entities in different passes. In such an embodiment, in step 210 a test is performed to determine if all entities were resolved. Incomplete resolution of entities may occur if entities were not selected in step 202 if no successful matches were found in the database in step 206 for the entities. If so, then control passes to step 212 in which the user may optionally save the set of criteria used in the process for future use on other data sets. If not all entities were resolved, then control passes to step 214 in which the matching criteria optionally may be modified for use in second or subsequent passes of the process; modifying the matching criteria may comprise receiving input in any of the ways described above for steps 202, 202A, 202B. Modified matching criteria may be provided in many different forms. For example, one matching approach may be used for entities representing citizens of a first country and another matching approach may be used for entities representing citizens of a second country. Control then transfers to step 202 and another pass of the process is applied to entities that were not resolved in the first pass or other prior passes.

As a result, imported data becomes associated with existing entities in the database, ensuring consistency and preventing duplication of records or entities in the database. For example, imported data for a particular individual can be associated with an existing entity in the database even when the imported data uses a different spelling for a name of the individual, provided that other defined criteria match between the imported data and the existing entity. Thus, imported data that semantically matches data in an existing entity of the database, even if the data does not syntactically or lexically match the data in the existing entity, becomes associated with the existing entity.

As another example, overlapping or duplicate data can be imported and joined to existing entities in the database based on specified criteria, such as matches in address, birth date, etc. Thus, if a user imports a data set and a particular imported row matches an existing entity on seven specified criteria, there can be strong confidence that the imported row is referring to the same individual as the existing entity in the database, and therefore all other fields of the row can be added to properties of the existing entity in the database; the imported row does not represent an entirely new data entity.

Further, if a different imported row matches an existing entity based on only two of seven properties, then an analyst might choose not to consolidate the imported row into an existing entity of the database, but create a new entity instead. As an example, if an imported row of information about an individual named "Jane Smith" matches an existing entity in the database only based on First Name and Last Name, but Address, Phone, and Birth Date are different, then consolidation is probably incorrect because different individuals are involved.

2.2 Importing Data

In various embodiments, processes and graphical user interfaces are provided to facilitate importing data from spreadsheets or other sources into the database. Embodiments provide an adaptable data importer that can greatly reduce the amount of effort expended organizing data from data sources. In one embodiment, a spreadsheet importation feature provides a comprehensive data import mechanism that can work with any delimited data file, or spreadsheet. Thus, whenever a user needs to bring information concerning an entity, event, or relationship that is not available in existing databases into an investigation, the user can quickly create a spreadsheet containing that data for importation.

In an embodiment, any structured, delimited data file representing entities, relationships, or events can be imported and each entity, event, or relationship is treated as a composite of its different properties and sub-properties. Therefore, embodiments can handle various organizations of information successfully and efficiently, allowing users to spend less time conforming to strict data input methodologies and more time focusing on an investigation or the use of the data. A user confirms that the system has deduced column and table types correctly, and then proceeds to entity resolution, described in the next section. If the system has deduced column or table types incorrectly, then the system adapts its ontology to the new format of column naming or spreadsheet typing, thus improving itself with every use.

The description herein assumes that a user or another system has created a data set in an electronic spreadsheet file. An example is a Microsoft Excel file. In general, a user activates the Data Importer 150 and selects a file for importation. The Data Importer 150 verifies the structure, character, and content of the information. The data is entered in one or more tables in revisioning database 108. The data then can pass through an entity resolution process for integration with other entities that are already represented in the database 108.

In one embodiment, a user activates Data Importer 150 by selecting a Data Import function from a graphical user interface that the application logic 112 generates in cooperation with GUI engine 134. In response, the Data Importer 150 generates data for a Data Importer screen, which the GUI engine 134 renders and provides to user terminal 106. The Data Importer screen provides options to import data from files and to import data from a database. As an example, importing data from a file is described herein.

A section of an "Add file" button is received. In response, Data Importer 150 generates and displays a "File Open" dialog box on user terminal 106. The user navigates to the file containing the information that the user wants to import and selects "Open". The user can import more than one file at a time, and alternatively can drag and drop the desired files onto the Data Importer screen.

In an embodiment, a database may be imported by selecting an "add database button." In an embodiment, a large or sensitive database may be imported using a "Link as Federated" selection, which causes the Data Importer 150 to import only the structure of the selected database so that information in the database is not available for query.

In response to receiving a selection of a file to import, the Data Importer 150 generates and displays a column identification screen on the user terminal. FIG. 3 illustrates an example column identification screen of the Data Importer 150. User interaction with the column identification screen 300 ensures that the system understands the character of the information that the user is importing. In the embodiment of FIG. 3, column identification screen 300 comprises a help panel 302, data sources panel 304, source file panel 306, column identification panel 310, details window 318, and navigation buttons 320.

The help panel 302 displays prompts and other help information to assist a user. The data sources panel 304 identifies sources of data that are undergoing importation; the currently imported source is highlighted. The source file panel 306 identifies the name and database table type 308 for the current file that is undergoing importation. The details window 318 provides a tree display of details about data that is being imported and allows the user to preview information from the contents of the data sources that the user is importing. The navigation buttons 320 enable a user to cancel importation and proceed forward or backward through functional steps in importation.

The column identification panel 310 displays the names of each of the columns in the imported file listed in a "Column Name" area 312. A "Column Type" area 314, "Role" area 316, "Link Type" area, and "Reference" area display information that the Data Importer 150 generated based on the imported file and the dynamic ontology of the system to guess what each of the columns in the imported file represents based on names in the imported file.

Key symbols 322 in FIG. 3 indicate primary keys. Primary keys comprise information that will uniquely identify each individual suspect, flight, phone call, etc., in database 108. In the example of FIG. 3, a list of suspects is being imported, and therefore first and last names are used to identify unique individuals. However, if there are two suspects with the same name in the list to be imported, then another primary key is used, such as a social security number or address. To add or remove an identifying attribute, the user selects a key symbol or selects a location at which a key should be placed. In response, the Data Importer 150 internally stores information designating a primary key column.

FIG. 4 illustrates setting the Role, Link Type, and Reference for a payments table. In an embodiment, when a user is importing data about events such as phone calls, emails, or payments, a Role chooser is used to define which column represents the recipient(s) and which the sender(s). For example, in FIG. 4 a user selects a Role combo box in Role area 316 and selects an available role for a payment such as "From" one entity to another.

In an embodiment, a Link Type menu 406 in Link Type area 402 allows a user to define a relationship between what the column represents and the primary event or entity of that row. For instance, if in a table of suspects there is a column that lists a coworker for each of them, the coworker link type could be selected. In the example of FIG. 4, a link type of "Participates In" has been selected for the payments represented in the imported data.

In an embodiment, a Ref. menu in Reference area 404 allows a user to set the type of entity referenced by that column, such as a person, business, or group. In the example of FIG. 4, the payor is a person and the payee is a business, as indicated by icons in Reference area 404.

If any data is incorrect in column type area 314, role area 316, or link type 402, a user can select a text entry box that contains erroneous data and navigate menus to find an appropriate label. In response, Data Importer 150 adds the new column type format to the database so that future import steps will take the new column type format into account. In the example of FIG. 4 no changes need to be made.

In an embodiment, if a column name in the imported file does not match the data in that column based on the expected ontology, Data Importer 150 highlights the column in an alternate color. In response, to fix the problem, a user can navigate the column's pull-down menu and select the appropriate column type.

Figure 5:
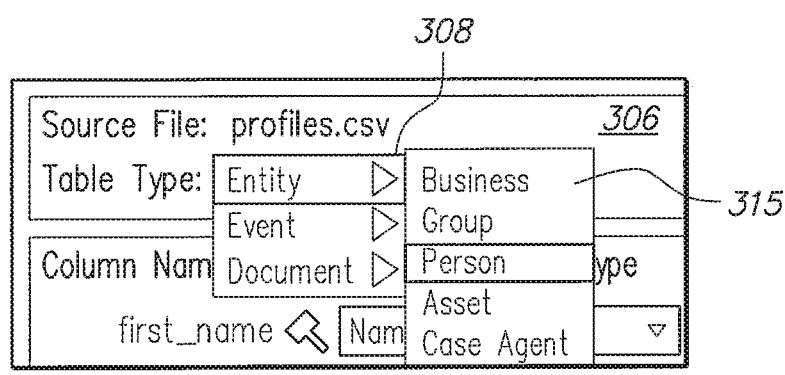
FIG. 5 illustrates an example graphical user interface when a user is verifying table type using the data importer.

FIG. 5 illustrates an example graphical user interface when a user is verifying table type using the data importer. In an embodiment, a user can check whether the system correctly determined what general category the information in the table falls into by reviewing values shown in Table Type area 306. If the system's initial guess is incorrect, then the user navigates a pull-down menu 308. The user can select a changed table type value from list 315. In response, data importer stores the changed table type value and adapts to use the changed table type value in future importation operations.

Selecting the NEXT button causes Data Importer 150 to import the data and place the data in a holding area of database 108 for evaluation, correction or entity resolution. After importation, statistics and errors are displayed.

Figure 6:
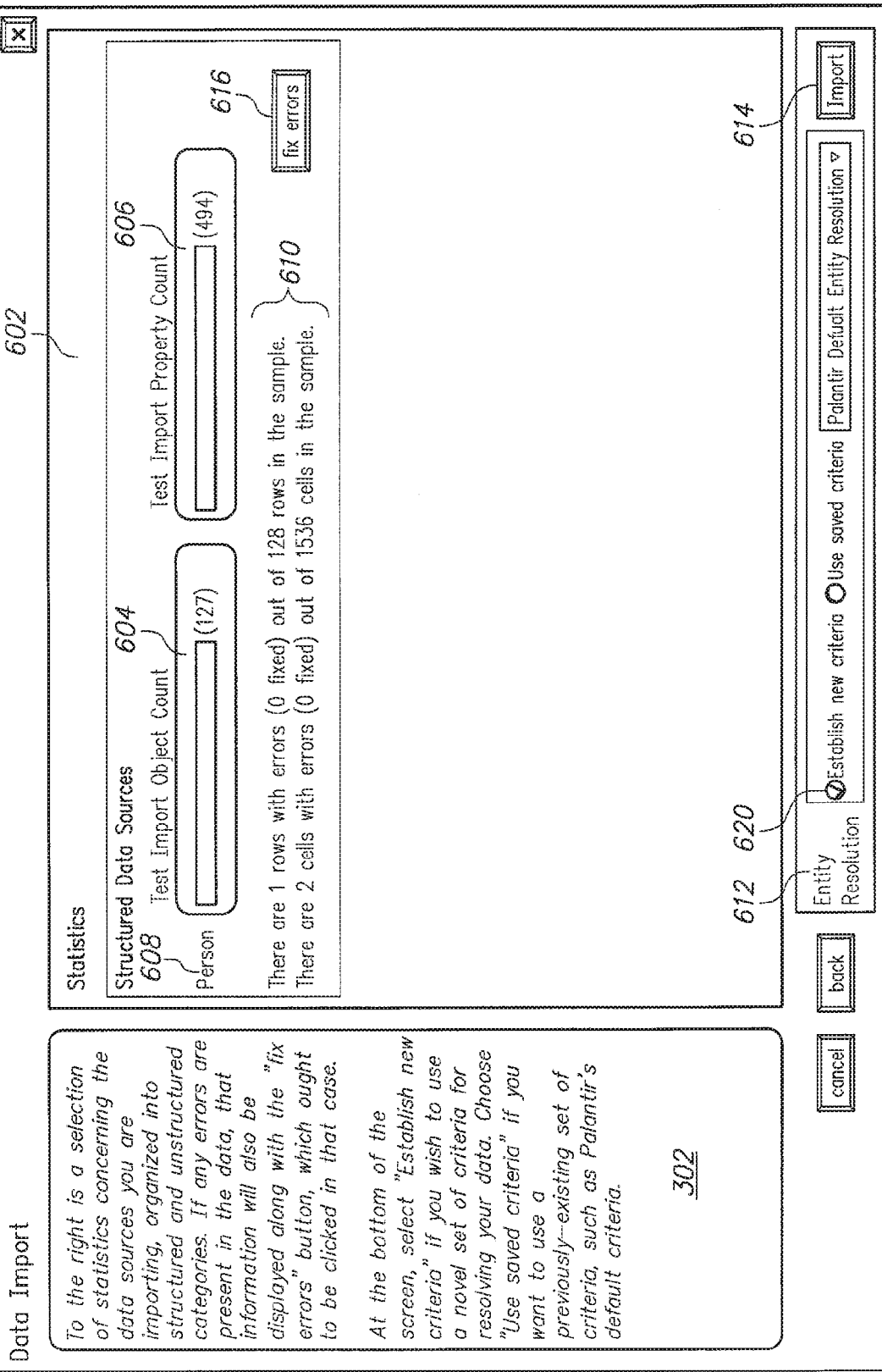
FIG. 6 illustrates a display of statistical information and errors for imported data.

FIG. 6 illustrates a display of statistical information and errors for imported data. In an embodiment, Data Importer 150 generates a selection of statistics on the data that is being imported and provides a user with the opportunity to fix any errors that the system detected. In the example of FIG. 6, a statistics window 602 displays statistics for structured data sources that include "Person" table types, as indicated by type label 608. Statistics include an object count 604 that identifies the total number of objects that were imported and a property count 606 that identifies the total number of object properties that were imported.

Error messages 610 specify errors that were found during data importing. If errors are present, the user can select a "fix errors" button 616 to activate error resolution logic. In response, Data Importer 150 generates an error display. FIG. 7 illustrates an example error display. An error display 702 may comprise an error listing 701 comprising one row for each error and comprising an Error Type column 706, Error Data column 708, Error Property column 710, and Error Data Source column 712. Thus, error listing 701 summarizes the errors and their nature.

In an embodiment, a repair panel 720 displays options for fixing the errors. For example, a user can specify replacing error data, removing a property, removing a row, or fixing the error later. A plurality of buttons 722 enable a user to apply the selected option to all errors or only a selected error.

In an embodiment, selecting an error from list 701 causes the Data Importer 150 to display the data row in which the error occurred at the bottom of the screen, with the erroneous data highlighted. In an embodiment, to fix erroneous data by replacing it with something else, a user can select the "replace with" option and type in the desired entry into the white box. Selecting "remove property" prevents the contents of the erroneous cell from being imported. Selecting "remove row" remove the entire row of data from the importation process.

Each time the user fixes data, the user has three options for applying it. To only apply the fix to the selected error, the user selects the "apply" button. If the error is a recurring error and the user wants to apply the same fix to each occurrence of the error, "apply same" is selected and applies the fix to any other errors of the same type, in the same column, and with the same field value. For instance, to remove a property on all entries of "xxxx" for a phone number, the user could select "apply same". The "apply all" option allows the user to apply a fix to all other errors of the same type and in the same column, for example, if various terms such as "n/a", "none", and "xxxx" were entered for lacking phone numbers.

Selecting the "ok" button 724 causes the data importer to re-display the previous screen of FIG. 6.

2.3 Entity Resolution 2.3.1 Overview of Example Implementation

FIG. 6 also illustrates information for choosing criteria for entity resolution at the end of data importation as indicated in entity resolution panel 612. In an embodiment, a user can choose whether to use new or established criteria for entity resolution.

Generally, entity resolution is a process of searching existing data stores for any matches to the information that the user is currently importing and then resolving matches into one object. When dealing with a large database containing information on millions of individuals, it is a common occurrence for many of them to posses the same name, which can make it a challenge to determine what information refers to each unique real-world individual. Moreover, factors such as misspellings, alternate spellings, and missing information can further complicate the issue. In a database that operates with tremendous amounts of data, the problem becomes even more difficult to deal with. To effectively deal with this dilemma and have only one database entry for each real person, embodiments provide a process of entity resolution. By performing algorithmic searches through all available information, entity resolution logic can identify if there are one or more records pertaining to a specific real-world entity and then merge those records together, thus "resolving" the entity. The end result is a single set of information, with each record relating to one unique entity.

Criteria refer to the search parameters used to look for matches to existing entities, which types of matches are consolidated, and the order in which different types of matches are consolidated. The criteria used for entity resolution include details such as which parameters are used to look for matches among existing entities, which types of matches are consolidated, and the order in which different types of matches are consolidated. Establishing new criteria allows a user to define a new set of these parameters and control the specific details of the entity resolution process. Selecting "Use saved criteria" enables a user to use a previously-existing set of criteria, or criteria. Using saved criteria allows the user to bypass the specifics of the entity resolution process, which is appropriate, for example, if the contents of the files to be imported will resolve easily.

With Entity Resolver 152, a user can effectively resolve newly imported information with existing records, allowing the user to immediately resume an investigation armed with the newly integrated information. Entity resolution utilizes a dynamic ontology of the database system and algorithms to find the best existing match for any new entity, event, or relationship that is imported. Every imported object is broken down into its constituent properties and sub-properties, analyzed, and compared to the existing data for matches. The properties used to define what makes an entity unique can be user-defined and adjusted to suit the situation. The Entity Resolver then seamlessly integrates the information from the two records.

For example, assume that analyst 102 (FIG. 1) has just received the names and some personal information of eight suspects, entered the information into a spreadsheet, and imported the data using Data Importer 150. Now the analyst 102 wants to see if any of the individuals are matches for entities already present in the database 108, which contains information on millions of individuals. However, within such a large group of people there are bound to be several potential matches, especially if any of the new suspects has a common name. With the Entity Resolver 152, the analyst 102 can scour the current information for a match using several of the entities' various characteristic properties. After finding the correct match, the Entity Resolver 152 resolves the two matching entities, combining their information into one unique individual. As a result, multiple disparate information sources can contribute to a shared data set.

Referring again to FIG. 6, in an embodiment, an "Establish new criteria" radio button 620 is selected and then the "Import" button 614 is selected. In response, an Entity Resolver display opens.

FIG. 8 illustrates an example Entity Resolver display. In an embodiment, the Entity Resolver display 802 comprises a plurality of step selection regions 801, 816, 818, 820. Each of the regions is visually expandable or collapsible in response to user input or in response to user selection of a graphical NEXT button or a BACK button. Region 801 when expanded is associated with a first step in entity resolution comprising selecting which entities are to be resolved. Region 816 when expanded is associated with a second step in entity resolution comprising choosing matching criteria. Region 818 when expanded is associated with a third step in entity resolution comprising finding successful matches and performing resolution. Region 820 when expanded is associated with a fourth step in entity resolution comprising checking and finalizing resolution. A user selection of a region 801, 816, 818, 820 causes the Entity Resolver display to provide features and functions relating to the selected step.

FIG. 8 shows an example Entity Resolver display when initially launched or when region 801 has been selected for the purpose of selecting which entities are to be resolved. In an embodiment, Entity Resolver display 802 comprises a help panel 804 and entity listing 806. The entity listing 806 comprises one or more rows of data for entities. Thus, each row represents data relating to an entity that has been imported from a data source. Each row comprises a selection checkbox 808. By default, all entities are selected, as seen in FIG. 8. To select only certain entities, the user de-selects or "un-checks" entities that should not be resolved, or highlights those that the user does wish to resolve selects the "select highlighted" button 810. The "select all" button 812 and "deselect all" buttons 814 enable a user to automatically cause selecting all entities or automatically cause un-selecting all entities.

Figure 12:
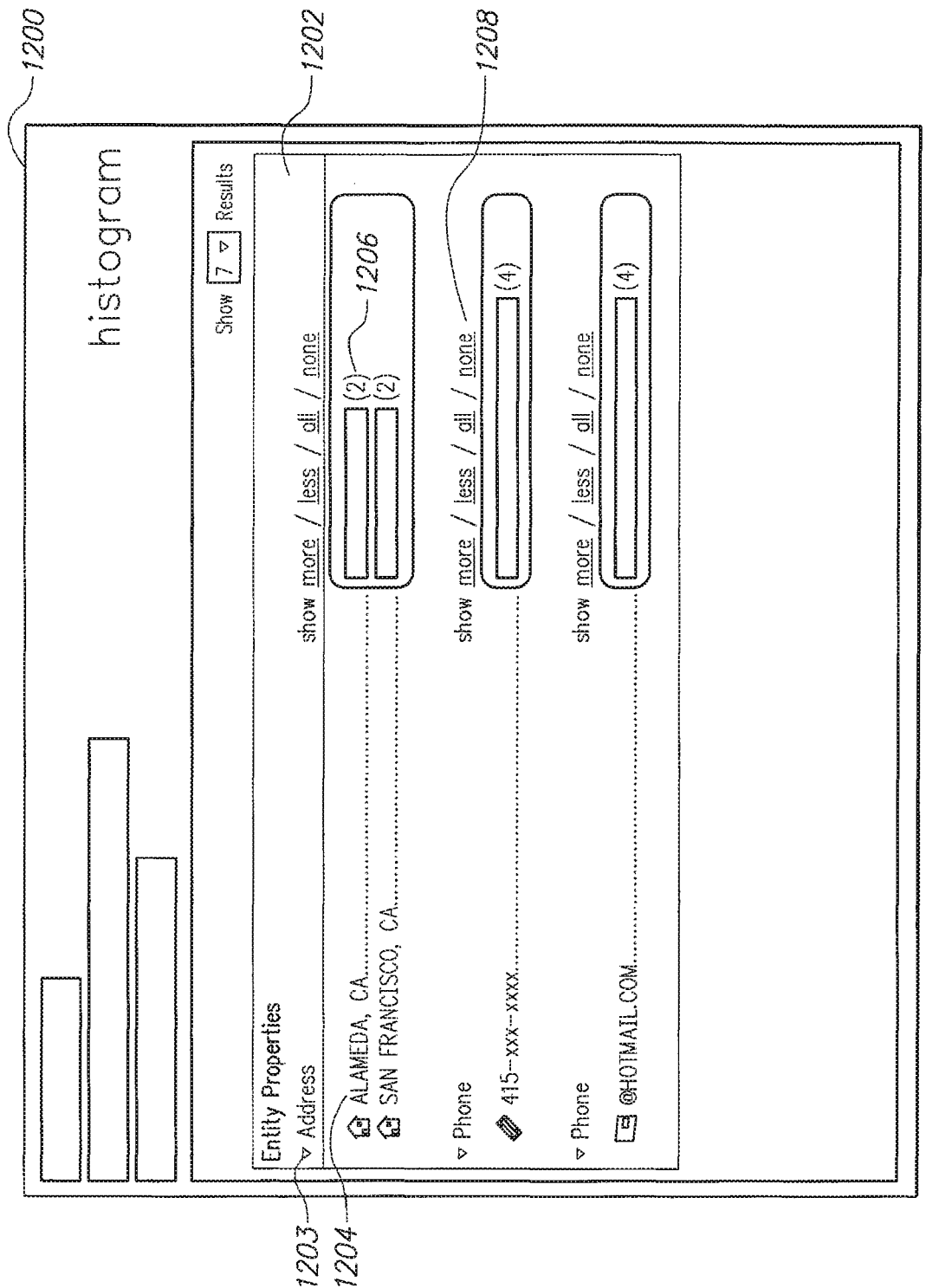
FIG. 12 illustrates an example Histogram window.

In an embodiment, launching the Entity Resolver 152 also causes displaying a Histogram window. FIG. 12 illustrates an example Histogram window. In an embodiment, a Histogram window 1200 comprises an entity properties panel 1202 that lists all properties of all entities of the imported data, values of the properties, and graphical indications of the number of such values represented in the imported data. For example, entity properties panel 1202 identifies an Address property 1203 and indicates that a value of "ALAMEDA, CA" occurs two times in the imported data, as seen by the bar and numeral at 1206. The graphical bar represents the relative magnitude of the value "2" as compared to all other counts of values shown in the histogram. Links 1208 enable a user to show more, less, all, or no values for the associated entity property.

At any time during entity resolution, the user can use the Histogram to highlight various data cohorts on the screen. For example, selecting the value "ALAMEDA, CA" in the Histogram display 1200 causes selecting in FIG. 8 only those entities that include the selected value—that is, only those individuals who have an address including "ALAMEDA, CA". Thus, the Histogram display 1200 interacts with screen display 802 of FIG. 8 and associated data transfers are performed under control of Entity Resolver 152. By then selecting a "select highlighted" button 810, the user can select just those entities to resolve.

Further, by interacting with the Histogram display 1200 and selecting data from that display, users can rapidly select different groups of entities to be associated with different matching criteria in subsequent stages of entity resolution. For example, the user might wish to apply one set of matching criteria to all imported data associated with "ALAMEDA, CA" in the Histogram display 1200 and a different set of matching criteria to imported data associated with a different property or value.

Figure 9:
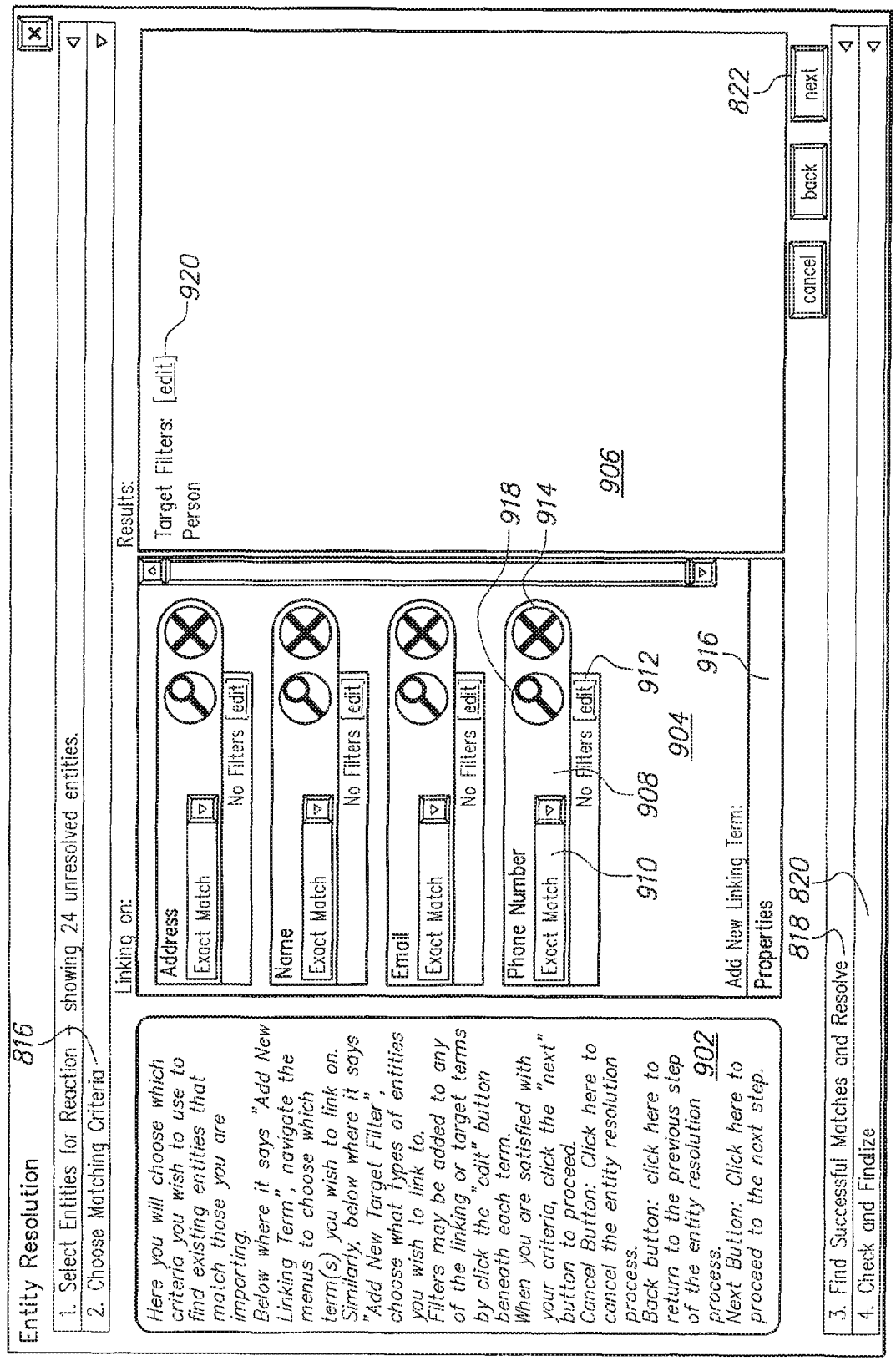
FIG. 9 illustrates an example Entity Resolver display associated with choosing matching criteria.

When the user is satisfied with the selection of entities, the user may select NEXT button 822 to advance to the second step in entity resolution. FIG. 9 illustrates an example Entity Resolver display associated with choosing matching criteria. In an embodiment, the Entity Resolver display includes a help panel 902, criteria panel 904, a results panel 906, and a properties menu 916.

In an embodiment, a user first chooses one or more properties of suspects to use to search for existing matches to the entities we are importing. The user navigates the properties menu 916 to select linking terms. As linking terms are selected, the linking terms are displayed in criteria panel 904. As an example, four (4) linking terms are shown in FIG. 9, indicating that the user is attempting to find a match using the suspects' names, phone numbers, addresses, and email addresses. Linking term 908 provides a specific example of a linking term that will match telephone number values.

After establishing one or more linking terms, the user can choose types of targets to match to by adding or removing target filters. In the example of FIG. 9, the type of target is "Person," meaning that the matching criteria of criteria panel 904 will be matched against "Person" entities in database 108. A user can add other target filters by selecting an "edit" link 920 in results panel 906. For example, the user might want to search on "Cargo Ships" as well as "Person" if the user thought that a person had been mislabeled as a cargo ship in the imported data.

For both the linking terms and targets, filters can be added to each item by clicking on an "edit" link 912. A linking term may be deleted by selecting a delete button 914.

A user may select NEXT button to advance. In response, the Entity Resolver performs a search of all entities in the database 108 and attempts to match all the imported data to existing entities in database 108 based on the criteria, and creates and stores data representing all matching entities. The data is organized according to sets of matching criteria.

In an embodiment, an Entity Resolver screen then displays results of matching. FIG. 10 illustrates an example Entity Resolver screen showing results of matching. The Entity Resolver screen display comprises a help panel 1002, a matching criteria panel 1004, and a matching entity listing 1010. The matching criteria panel 1004 lists which sets of criteria 1006 the data has been linked to existing entities on, and a count 1008 of how many of the imported entities fit in each of the sets of criteria. One or more sets of criteria may be displayed; for example, some of the imported data might match existing entities in database 108 based on "Email" and "Address," whereas other existing entities might match based on "Email," "Address," "Phone Number," and "Name." In that case, FIG. 10 would display two rows in matching criteria panel 1004—one row as "Email, Address" and the other row as "Email, Address, Phone Number, Name."

Selecting one of the sets of criteria 1006 causes the Entity Resolver 152 to display the matching entity listing 1010, showing the imported entities 1014 that belong to the associated set, and which existing entities 1016 they were matched to, based on those criteria. Thus, if matching criteria panel 1004 includes multiple rows of criteria 1006, selecting a different row causes matching entity listing 1010 to change to show only the entities that matched the selected criteria. If imported data does not match any entities in the database 108, then matching criteria panel 1004 displays a "No Matches" indicator as a row of criteria 1006 and a corresponding count 1008 of the number of imported data entities that matched no existing entity.

Each row or association of an imported entity 1014 and a matched entity 1016 includes a selection checkbox 1012. In an embodiment, a user selects one or more entity associations for resolution. To select only those entities for which there is one match, a user selects a "select unique matches" button 1018. To resolve those matches that the user has highlighted using selection checkboxes 1012, the user selects a "select highlighted" button 1020. To select all matches, the user selects a "select all" button 1022, and to deselect all matches, the user selects a "deselect all" checkbox 1024.

If there are incorrect matches for an entity, a user can select a correction icon 1028 adjacent to the match that is incorrect. For example, if an imported entity incorrectly matched multiple existing entities in the database because a name is common, or matched an entity that is clearly incorrect based on name, then the user can remove the match by selecting correction icon 1028.

When the user is satisfied with the selections, the user selects a "consolidate" button 1026 and moves on to the next set of properties shown in criteria panel 1004. Selecting "consolidate" causes Entity Resolver 152 to perform a merge operation in which the imported data is merged into the matched entities existing in the database 108. The merge operation adds any new values for properties or fields of the imported database into the matched existing entity, so that the matched existing entity is updated with the imported values. In an embodiment, consolidation can be organized as a two-phase commit operation in which a first phase occurs in response to selecting "consolidate" button 1026 and a second phase or commit of the consolidation occurs after the finalization step described in connection with FIG. 11.

When the user has completed review of all selections for all properties, the third step in entity resolution is complete and the user selects NEXT button 822 to proceed. In response, the Entity Resolver transitions to the fourth step in entity resolution, relating to checking and finalizing resolution data.

Figure 11:
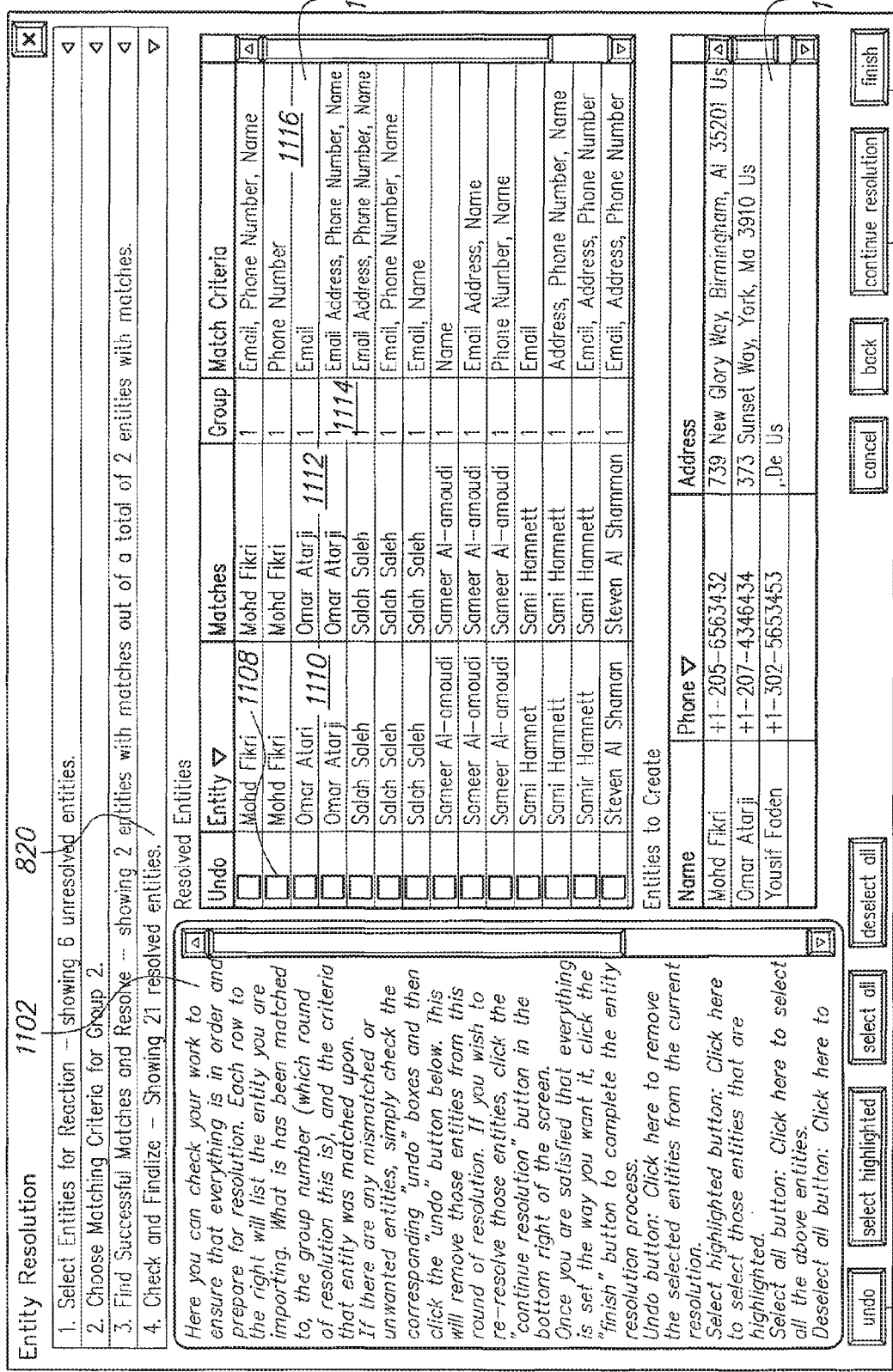
FIG. 11 illustrates an example screen of the Entity Resolver relating to checking and finalizing.

FIG. 11 illustrates an example screen of the Entity Resolver relating to checking and finalizing. In an embodiment, an Entity Resolver screen comprises a help panel 1102, resolved entities listing 1104, and new entities listing 1106.

The resolved entities listing 1104 lists the entities that the user is importing that have been matched to existing data, what they have been matched to, the group number (which round of resolution this is), and the criteria that each entity was matched upon. For example, resolved entities listing 1104 comprises an entity column 1110 that lists a name of each entity in the imported data. Resolved entities listing comprises a match column 1112 that lists a name of each existing entity in the database 108 that matches the corresponding entity in column 1110. For example, note that the imported entity "Samir Hamnett" in column 1110 matches the existing entity "Sami Hamnett" in column 1112, having slightly different spelling. Column 1114 lists a group number for a group of data undergoing resolution. Match criteria column 1116 lists all criteria of the imported entity that match the corresponding existing entity.

If there are any mismatched or unwanted entities, the user selects the corresponding "undo" boxes 1108 and then selects the "undo" button 1120. In response, Entity Resolver 152 removes those entities from this round of resolution. If the user wants to re-resolve those entities, the user can select a "continue resolution" button 1122.

In an embodiment, new entities listing 1106 displays the new entities that will be created in database 108 because no matches were found in the database during the entity resolution process.

When the user is satisfied with the displayed information, the user can select a "finish" button 1124 to complete the entity resolution process.

2.3.2 Saved Criteria Sets

In an embodiment, when all desired linking terms are established in criteria panel 904, and the user selects the NEXT button, Entity Resolver 150 prompts the user to enter a name for the linking criteria and saves the linking criteria as a named set of criteria. Alternatively, linking criteria may be saved in response to user selection of the FINISH button 1124 of FIG. 11. After saving the linking criteria, the user can perform future data importation operations by selecting the saved criteria, as described above for FIG. 6, reference numerals 612, 620, 614. When saved criteria is used, the user performs entity resolution by interacting with the screen displays of FIG. 8, FIG. 10, and FIG. 11, but choosing matching criteria as seen in FIG. 9 is not necessary and Entity Resolver 150 skips over the functions associated with FIG. 9.

In an embodiment, creating and storing matching criteria also includes monitoring and recording user interactions with Histogram display 1200 (FIG. 12) and selections of matching criteria in panel 1004 (FIG. 10). In this embodiment, the Entity Resolver monitors user interaction of data selections and stores, as saved criteria, the properties that a user selected from the Histogram display 1200, the linking criteria from panel 904 of FIG. 9, and the matching criteria sets 1006 that the user selected from panel 1004. All such data is associated and stored as a named saved criteria set. Storing may occur in response to user selection of the FINISH button 1124 (FIG. 11).

Thereafter, the user can specify a data source for importation, select the saved criteria at FIG. 6, and perform an expedited form of entity resolution. In expedited entity resolution, the Entity Resolver 152 automatically performs the first three steps of entity resolution that have been described in reference to FIG. 8, FIG. 9, and FIG. 10 and displays a summary screen indicating the results of automatic entity resolution. Alternatively, after the first three steps are performed, the screen display of FIG. 11 is displayed and the user can check and finalize the resolutions. Any entities in imported data that do not match entities of the database 108 are created as new entities in the database. As a result, the system becomes adaptive and entity resolution proceeds far more rapidly for subsequent data sets.

2.3.3 Alternate Matching Techniques

Referring again to FIG. 9, in an embodiment, the form of matching to perform using the linking criteria of panel 904 is specified by selecting a value from a pull-down menu 910 in each linking term 908. In one embodiment, matching techniques in menu 910 include "exact match" and various kinds of fuzzy matching approaches such as "contains." In an embodiment, the criteria sets 1006 of FIG. 10 reflect the matching technique that was selected. For example, panel 1004 of FIG. 10 may display "Exact Match: Email, Address" to indicate that an associated count 1008 reflects an exact match of imported data to email and address properties of an existing entity in the database 108.

In another embodiment, pull-down menu 910 includes a "No Conflicts" selection and matching occurs only if the imported data has no conflicts with entities in the database 108. An example may illustrate the meaning of "no conflicts." Assume that entities Rosa Klebb and Ernst Blofeld are the subjects of entity resolution and each of Klebb and Blofeld has two addresses associated with it. In database 108, every property can have multiple associated values. Klebb and Blofeld would have "no conflicts" if either (1) Klebb and Blofeld have at least one address that matches or (2) Klebb has address data and Blofeld has no address data. Conversely, Klebb and Blofeld do not have "no conflicts" if any address of Klebb or Blofeld does not match any address of the other. This approach allows an analyst to disambiguate entities based on the lack of data for a particular property as compared to a conflict in known data for the property.

2.3.4 "One Click" Approach

In an embodiment, a one-click approach supports expedited entity resolution. In the one-click approach, a user first selects imported data for two or more individuals that are believed to be the same. For example, referring to FIG. 8, a user may select two individuals shown in rows of screen display 802 that are believed to be the same. The user then activates a special-purpose menu of options for working with the selected individuals. In an embodiment, the user selects a right side button of a mouse or other pointing device ("right clicks"), and in response, Entity Resolver 150 displays a pop-up menu of functions that can be applied to the selected individuals. In an embodiment, one function in the pop-up menu is "Resolve." When the user selects "Resolve," the Entity Resolver 150 automatically performs entity resolution on the selected individuals and displays results. Activation of the "one-click" approach in this manner is equivalent to selecting the "consolidate" button 1026 in the process of FIG. 10.

3.0 Implementation Mechanisms—Hardware Overview

Figure 13:
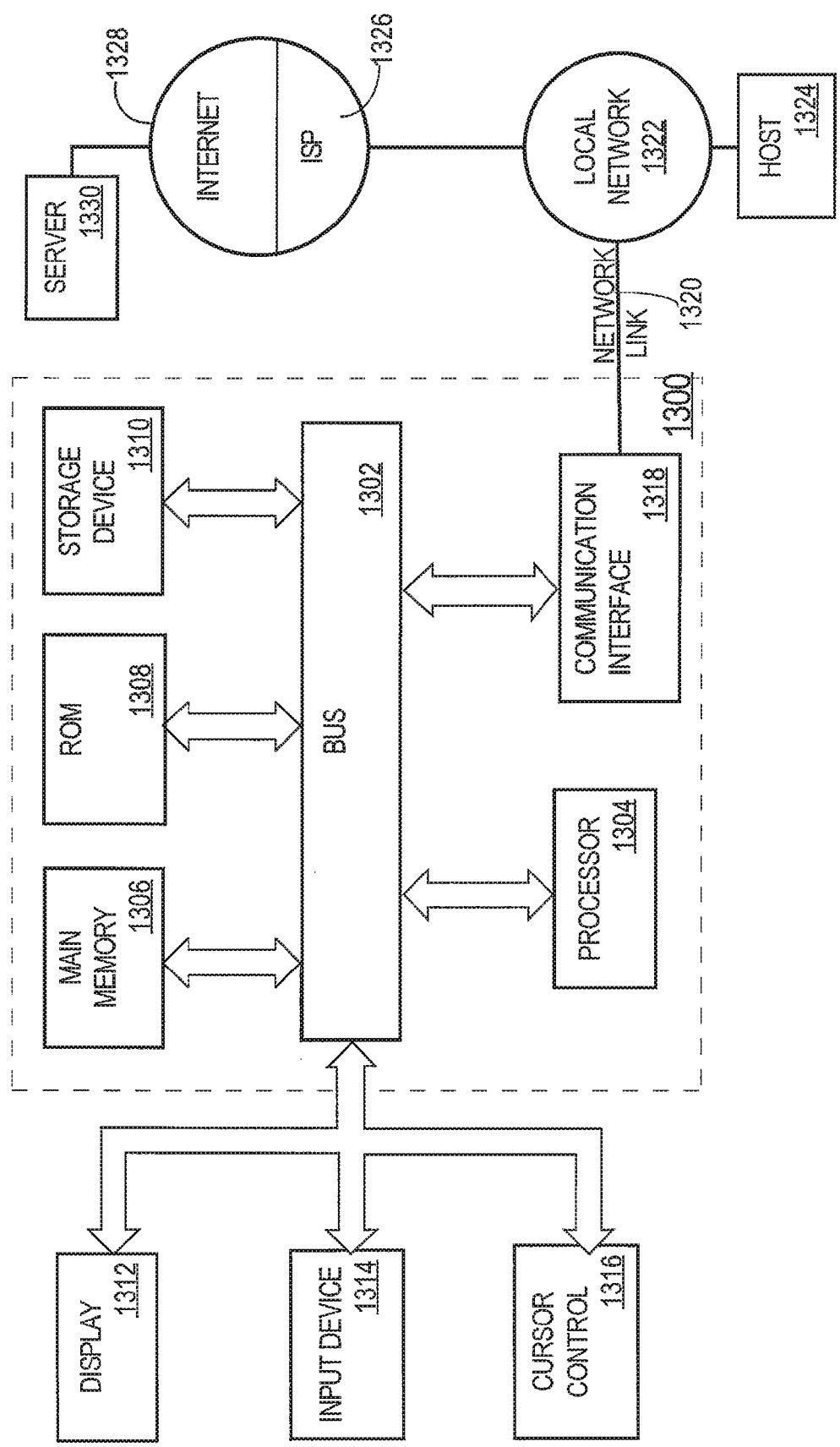
FIG. 13 illustrates a computer system upon which an embodiment may be implemented.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory ("RAM") or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory ("ROM") 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube ("CRT"), for displaying information to a computer user. An input device 1314, including alphanumeric and other keys, is coupled to bus 1302 for communicating information and command selections to processor 1304. Another type of user input device is cursor control 1316, such as a mouse, trackball, stylus, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for entity resolution. According to one embodiment of the invention, entity resolution is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network ("ISDN") card or a modem to provide a data communication connection to a corresponding type of telephone line. As another example, communication interface 1318 may be a local area network ("LAN") card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider ("ISP") 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for entity resolution as described herein.

The received code may be executed by processor 1304 as it is received, and/or stored in storage device 1310, or other non-volatile storage for later execution. In this manner, computer system 1300 may obtain application code in the form of a carrier wave.

Data Importer 150 and Entity Resolver 152 each may be implemented in one or more computer programs, firmware, or a combination. The Data importer 150 and Entity Resolver 152 may be implemented in unitary fashion or as separate modules. Alternatively, a special-purpose computer can be configured with software, firmware, hardware, other logic, or a combination to implement Data Importer 150 and Entity Resolver 152. When Data Importer 150 and Entity Resolver 152 are implemented in software, program instructions may be loaded into electronic digital memory of a computer system for execution by a processor and thus the program instructions become a part of the electronic digital memory.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of matching a plurality of imported data entities to a plurality of existing data entities in a database comprising:

receiving first input specifying a first matching criteria that is based at least in part on a first subset of one or more properties of the imported data entities, and specifying a first matching technique to use as part of the first matching criteria;

receiving second input specifying a second matching criteria that is different from the first matching criteria and that is based at least in part on a second subset of the one or more properties of the imported data entities, wherein the second subset of the one or more properties is different than the first subset of one or more properties, and specifying a second matching technique that is different than the first matching technique and to use as part of the second matching criteria;

receiving third input specifying a particular one of the imported data entities and signaling a request to resolve that particular one of the imported data entities in relation to the existing data entities;

matching the particular one of the imported data entities to a first subset of the existing data entities using the first matching criteria and using the first matching technique;

matching the particular one of the imported data entities to a second subset of the existing data entities using the second matching criteria and using the second matching technique;

causing display of a first result of matching the particular one imported data entity to the first subset of the existing data entities and a second result of matching the particular one imported data entity to the second subset of the existing data entities;

receiving, in response to the display, a selection of one or more of continuing resolving the particular one imported data entity, resolving others of the imported data entities, and consolidating the particular one imported data entity into the existing data entities, the consolidating comprising adding at least one value from the particular one imported data entity to one of the first subset of the existing data entities or one of the second subset of the existing data entities;
performing further resolution or consolidation based on the selection,
wherein the method is performed by one or more computing devices.

2. The method of claim 1, the selection being consolidating the particular one imported data entity into the existing data entities.

3. The method of claim 1,
wherein the first matching criteria checks for an exact match between the first subset of one or more properties and a first corresponding subset of one or more properties of the existing data entities, and
wherein the second matching criteria checks for an exact match between the second subset of one or more properties and a second corresponding subset of one or more properties of the existing data entities.

4. The method of claim 1,
wherein the first matching criteria does not allow any conflicts between the first subset of one or more properties and a first corresponding subset of one or more properties of the existing data entities, and
wherein the second matching criteria does allow at least some conflicts between the first subset of one or more properties of the imported data entities and the first corresponding subset of one or more properties of the existing data entities.

5. The method of claim 1,
wherein the first matching criteria does not allow missing information in the first subset of one or more properties, and
wherein the second matching criteria does allow missing information in the first subset of one or more properties.

6. The method of claim 1, wherein the first subset and the second subset each have two or more properties.

7. The method of claim 1, wherein the first matching criteria checks for an exact match, and wherein the second matching criteria checks for a fuzzy match.

8. The method of claim 1, comprising storing the first matching criteria and the second matching criteria for use in subsequent entity resolution operations.

9. The method of claim 1, comprising:
receiving input that specifies one or more names of stored matching criteria;
loading the stored matching criteria based at least in part on the input;
automatically matching imported data entities to existing data entities using the loaded matching criteria.

10. The method of claim 1, comprising:
determining that the imported data entities comprise one or more unresolved data entities, and, in response:
matching the one or more unresolved data entities to a third subset of the existing data entities using at least a third matching criteria that is different from the first matching criteria and the second matching criteria;
consolidating a third selected matched entity from the one or more unresolved data entities with a third existing entity of the third subset of the existing data entities.

11. One or more non-transitory computer-readable storage media comprising stored instructions which, when executed by one or more processors, cause performing a method of matching a plurality of imported data entities to a plurality of existing data entities in a database comprising:
receiving first input specifying a first matching criteria that is based at least in part on a first subset of one or more properties of the imported data entities, and specifying a first matching technique to use as part of the first matching criteria;
receiving second input specifying a second matching criteria that is different from the first matching criteria and that is based at least in part on a second subset of the one or more properties of the imported data entities, wherein the second subset of the one or more properties is different than the first subset of one or more properties, and specifying a second matching technique that is different than the first matching technique and to use as part of the second matching criteria;
receiving third input specifying a particular one of the imported data entities and signaling a request to resolve that particular one of the imported data entities in relation to the existing data entities;
matching the particular one of the imported data entities to a first subset of the existing data entities using the first matching criteria and using the first matching technique;
matching the particular one of the imported data entities to a second subset of the existing data entities using the second matching criteria and using the second matching technique;
causing display of a first result of matching the particular one imported data entity to the first subset of the existing data entities and a second result of matching the particular one imported data entity to the second subset of the existing data entities;
receiving, in response to the display, a selection of one or more of continuing resolving the particular one imported data entity, resolving others of the imported data entities, and consolidating the particular one imported data entity into the existing data entities, the consolidating comprising adding at least one value from the particular one imported data entity to one of the first subset of the existing data entities or one of the second subset of the existing data entities;
performing further resolution or consolidation based on the selection.

12. The one or more non-transitory computer-readable storage media of claim 11, the selection being consolidating the particular one imported data entity into the existing data entities.

13. The one or more non-transitory computer-readable storage media of claim 11,
comprising instructions which when executed cause using the first matching criteria to check for an exact match between the first subset of one or more properties and a first corresponding subset of one or more properties of the existing data entities, and
comprising instructions which when executed cause using the second matching criteria to check for an exact match between the second subset of one or more properties and a second corresponding subset of one or more properties of the existing data entities.

14. The one or more non-transitory computer-readable storage media of claim 11,
comprising instructions which when executed cause the first matching criteria not allowing any conflicts between the first subset of one or more properties and a first corresponding subset of one or more properties of the existing data entities, and
comprising instructions which when executed cause the second matching criteria allowing at least some conflicts between the first subset of one or more properties of the imported data entities and the first corresponding subset of one or more properties of the existing data entities.

15. The one or more non-transitory computer-readable storage media of claim 11,
comprising instructions which when executed cause the first matching criteria not allowing missing information in the first subset of one or more properties, and
comprising instructions which when executed cause the second matching criteria allowing missing information in the first subset of one or more properties.

16. The one or more non-transitory computer-readable storage media of claim 11, wherein the first subset and the second subset each have two or more properties.

17. The one or more non-transitory computer-readable storage media of claim 11, comprising instructions which when executed cause the first matching criteria checking for an exact match and the second matching criteria checking for a fuzzy match.

18. The one or more non-transitory computer-readable storage media of claim 11, wherein the instructions when executed cause storing the first matching criteria and the second matching criteria for use in subsequent entity resolution operations.

19. The one or more non-transitory computer-readable storage media of claim 11, wherein the instructions when executed cause:
receiving input that specifies one or more names of stored matching criteria;
loading the stored matching criteria based at least in part on the input;
automatically matching imported data entities to existing data entities using the loaded matching criteria.

20. The one or more non-transitory computer-readable storage media of claim 11, comprising instructions which when executed cause:
determining that the imported data entities comprise one or more unresolved data entities, and, in response:
matching the one or more unresolved data entities to a third subset of the existing data entities using at least a third matching criteria that is different from the first matching criteria and the second matching criteria;
consolidating a third selected matched entity from the one or more unresolved data entities with a third existing entity of the third subset of the existing data entities.

* * * * *